May 27, 1941.  G. WAHNISH  2,243,588
LATHE TAILSTOCK ADJUSTING MEANS
Filed July 31, 1939
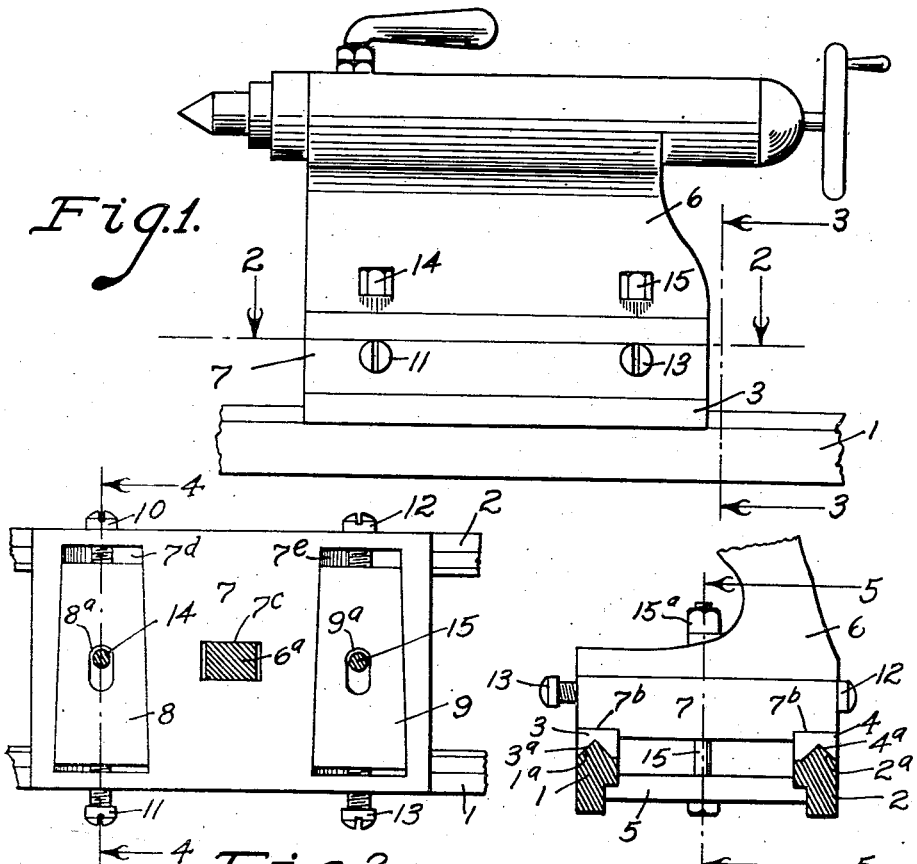
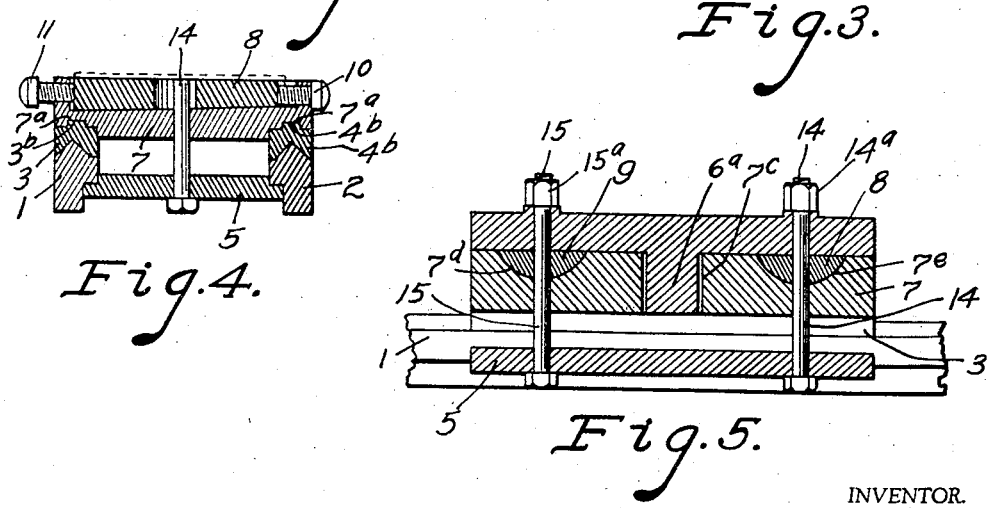
INVENTOR.
George Wahnish
BY
A. B. Bowman
ATTORNEY.

Patented May 27, 1941

2,243,588

UNITED STATES PATENT OFFICE 2,243,588

LATHE TAILSTOCK ADJUSTING MEANS

George Wahnish, Los Angeles, Calif.

Application July 31, 1939, Serial No. 287,615

7 Claims. (Cl. 82—31)

My invention relates to a means for tilting the tailstock of a lathe and supporting it in such tilted position so that it is properly positioned for holding the work and the objects of my invention are:

First, to provide a lathe tailstock adjusting means so that the tailstock may be positioned as desired relatively to the lathe bed ways of the lathe;

Second, to provide an adjusting means of this class whereby the tailstock may be raised at its front portion and lowered at its back portion or raised at its back portion and lowered at its front portion, as desired;

Third, to provide an adjusting means of this class in which the tailstock may be rigidly secured in such adjusted position;

Fourth, to provide an adjusting means of this class which obviates the necessity of refinishing the lathe bed ways and slide members caused by wear;

Fifth, to provide a lathe tailstock adjusting means of this class which provides for more accurate and finer grade of work on the lathe;

Sixth, to provide an adjusting means of this class by which the tailstock spindle or dead center may be always positioned in alignment with the live spindle of the lathe;

Seventh, to provide an adjusting means of this class which is readily applicable for use in connection with the conventional lathe tailstock now in use with but slight change; and Eighth, to provide a lathe tailstock adjusting means of this class which is very simple and economical of construction, easy to install, easy to operate, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a side elevational view of a lathe tailstock of substantially conventional form showing my adjusting means in connection therewith and showing a portion of the lathe bed fragmentarily; Fig. 2 is a sectional view taken from the line 2—2 of Fig. 1; Fig. 3 is a fragmentary sectional view taken from the line 3—3 of Fig. 1;

Fig. 4 is a sectional view taken from the line 4—4 of Fig. 2 showing some of the parts and portions in elevation to facilitate the illustration and Fig. 5 is a sectional view taken from the line 5—5 of Fig. 3 showing some of the parts and portions in elevation to facilitate the illustration.

Similar characters of reference refer to similar parts and portions throughout the several views of the drawing.

The lathe bed ways 1 and 2, slide members 3 and 4, clamp member 5, tailstock 6, tailstock support 7, tailstock adjusting members 8 and 9, tailstock adjusting bolts 10 to 13 inclusive, and clamp bolts 14 and 15 constitute the principal parts and portions of my lathe tailstock adjusting means.

The slide rests 1 and 2, slide members 3 and 4 and clamp member 5 are substantially conventional type of lathe tailstock support. The lathe bed ways 1 and 2 are provided longitudinally along their upper sides with inverted V shaped in cross section 1a and 2a over which rests conforming grooves 3a and 4a in the slide members 3 and 4, as shown best in Figs. 3 and 4 of the drawing. These slide members 3 and 4 are provided with upwardly extending bosses substantially at their middle portions at 3b and 4b which extend upwardly into similar recesses 7a in the tailstock support 7, shown best in Fig. 4.

The tailstock support 7 is also provided with longitudinally disposed grooves at its opposite sides 7b into which the upper sides of the slide members 3 and 4 extend, as shown best in Figs. 3 and 4 of the drawing. This support 7 is a substantially rectangularly shaped metallic block and is provided centrally with a rectangularly shaped hole 7c therethrough, shown best in Figs. 2 and 5 of the drawing, which recess is adapted to receive a downwardly extending lug or boss 6a positioned centrally on the lower side of the tailstock 6. Otherwise the tailstock 6 is substantially flat on its lower side. Positioned in the upper side of the tailstock support 7 on opposite sides of the hole 7b and extending laterally in said upper surface are tapered curved grooves 7d and 7e, shown best in Figs. 2 and 5 of the drawing. Positioned in the tapered curved grooves are the tailstock adjusting members 8 and 9 which conform to said grooves 7d and 7e respectively and extend slightly above the same when shifted toward the narrow end thereof but are substantially flush with the same when moved to near the wider end thereof and said members 8 and 9 are considerably shorter than said grooves as shown best in Fig. 2 of the drawing so that they may be shifted longitudinally in said grooves in either direction independently of each other. These members 8 and 9 are provided with longitudinal slots 8a and 9a to which extend the clamp bolts 14 and 15 which extend through the clamp member 5 at their lower ends and extend upwardly through the slots 8a and 9a and they are provided with nuts 14a and 15a at their upper end for securing and clamping the tailstock 6, tailstock support 7, lathe bed ways 1 and 2 and slide members 3 and 4 rigidly together, as shown best in Figs. 3 and 5 of the drawing.

Screw threaded into the opposite sides of the support 7 near one end are the tailstock adjusting bolts 10 and 11. Their inner ends extend inwardly adapted to engage the opposite ends of the tailstock adjusting member 8 and near the opposite ends and similarly positioned are the adjusting bolts 12 and 13 which are adapted to engage the opposite ends of the tailstock adjusting member 9. Thus the bolts 10 to 13 are arranged for shifting the members 8 and 9 longitudinally in the grooves 7d and 7e respectively for raising and lowering them in said grooves and providing adjustable supports for the flat portion of the tailstock 6 which rests thereon near its opposite ends and secured in such adjusted relation by means of the clamp bolts 14 and 15.

It will be here noted that the tailstock 6 other than its securing and supporting means at its lower side may be of any conventional type and is no part of my present invention.

The operation of my lathe tailstock adjusting means is substantially as follows:

If it is desired to raise the front end of the tailstock upwardly relatively to the back end, the adjusting screw 10 is screwed outwardly slightly and the adjusting screw 11 is screwed inwardly slightly shifting the member 8 toward the narrower end of the groove 7b which will cause the member 8 to raise relatively to the support 7 above the upper surface of the member 7 and raise the tailstock 6. Before this is done, however, the clamp bolts 14 and 15 must be loosened slightly to permit the raise. The back end may also be lowered, if required, by loosening the bolt 13 slightly, then tightening the bolt 12, which will shift the adjusting member 9 toward the large end and lower the member 9.

Though I have shown and described a particular construction, combination and arrangement of parts and portions, I do not wish to be limited to this particular construction, combination and arrangement but desire to include in the scope of my invention, the construction, combination and arrangement substantially as set forth in the appended claims.

Having thus described my invention, what I claim as new and desire to secure by Letters Patent is:

1. In a lathe tailstock adjusting means of the class described, a tailstock support including a tailstock supporting block shiftably mounted upon the slide rest of the bed of the lathe and wedge means shiftably mounted at the front and back sides transversely of said block with their upper sides engageable with the tailstock.

2. In a lathe tailstock adjusting means of the class described, a tailstock support including a tailstock supporting block shiftably mounted upon the slide rest of the bed of the lathe and wedge means shiftably mounted at the front and back sides transversely of said block with their upper sides engageable with the tailstock, said wedge means including transversely positioned tapered grooves in said block provided with curved tapered lower sides and conforming blocks shorter than said grooves positioned therein.

3. In a lathe tailstock adjusting means of the class described, a tailstock support including a tailstock supporting block shiftably mounted upon the slide rest of the bed of the lathe and wedge means shiftably mounted at the front and back sides transversely of said block with their upper sides engageable with the tailstock, said wedge means including transversely positioned tapered grooves in said block provided with curved tapered lower sides and conforming blocks shorter than said grooves positioned therein, and adjustable bolt means engageable with the opposite ends of said wedge means.

4. In a lathe tailstock adjusting means of the class described, a tailstock support including a tailstock supporting block shiftably mounted upon the slide rest of the bed of the lathe and wedge means shiftably mounted at the front and back sides transversely of said block with their upper sides engageable with the tailstock, said wedge means including transversely positioned tapered grooves in said block provided with curved tapered lower sides and conforming blocks shorter than said grooves positioned therein, adjustable bolt means engageable with the opposite ends of said wedge means, the upper surface of said wedge means being substantially horizontal and flat.

5. In a lathe tailstock adjusting means of the class described, the combination with slide rests of the lathe and slide members shiftable longitudinally thereon, a tailstock support connected to said slide members, a tailstock mounted on said support and means for separately raising or lowering either end of said tailstock relatively to said support and relatively to the other end.

6. In a lathe tailstock adjusting means of the class described, the combination with slide rests of the lathe and slide members shiftable longitudinally thereon, a tailstock support connected to said slide members, a tailstock mounted on said support and means for separately raising or lowering either end of said tailstock relatively to said support and relatively to the other end, said means for raising including tapered curved sided wedge members mounted in grooves in said support and shiftable longitudinally in said grooves.

7. In a lathe tailstock adjusting means of the class described, the combination with slide rests of the lathe and slide members shiftable longitudinally thereon, a tailstock support connected to said slide members, a tailstock mounted on said support and means for separately raising or lowering either end of said tailstock relatively to said support and relatively to the other end, said means for raising including tapered curved sided wedge members mounted in grooves in said support and shiftable longitudinally in said grooves, and means for adjusting the positions of said wedge members in their grooves from the outside of said tailstock support.

GEORGE WAHNISH.